United States Patent
Foden et al.

[15] 3,676,464
[45] July 11, 1972

[54] 2-SUBSTITUTED BENZYLIDENE-4-PHENYL-3-HYDROXY-5-OXO-2,5-DIHYDROFURAN DERIVATIVES

[72] Inventors: Frederick Roger Foden; Derrick Michael O'Mant, both of Macclesfield, England

[73] Assignee: Imperial Chemical Industries, Limited, London, England

[22] Filed: Oct. 19, 1970

[21] Appl. No.: 82,214

[30] Foreign Application Priority Data

Oct. 29, 1969    Great Britain......................52,969/69

[52] U.S. Cl..........................260/343.6, 260/343.3, 424/226, 424/232, 424/240, 424/247, 424/258, 424/259, 424/260, 424/265, 424/266, 424/273, 424/274, 424/279

[51] Int. Cl. .........................................................C07d 5/10
[58] Field of Search.............................................260/343.6

[56] References Cited

UNITED STATES PATENTS 3,287,459    11/1966    Zimmer et al. ......................260/343.6

*Primary Examiner*—Henry R. Jiles
*Assistant Examiner*—Anne Marie T. Tighe
*Attorney*—Cushman, Darby & Cushman

[57] ABSTRACT

2-Substituted benzylidene-e-phenyl-3-hydroxy-5-oxo-2,5-dihydrofuran derivatives, for example 2-(m-trifluoromethyl-α-methoxycarbonylbenzylidene)-4-phenyl-3-hydroxy-5-oxo-2,5- dihydrofuran, a process for their preparation, and pharmaceutical compositions. Compounds have anti-inflammatory, analgesic and antipyretic activity.

4 Claims, No Drawings

3,676,464

2-SUBSTITUTED BENZYLIDENE-4-PHENYL-3-HYDROXY-5-OXO-5-DIHYDROFURAN DERIVATIVES

This invention relates to new heterocyclic compounds, and more particularly it relates to new dihydrofuran derivatives which have anti-inflammatory, analgesic and antipyretic activity.

According to the invention there are provided dihydrofuran derivatives of the general formula:

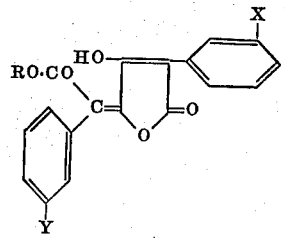

wherein R stands for a $C_{1-3}$ alkyl radical, and one of X and Y stands for a hydrogen, fluorine, chlorine, bromine or iodine atom, a trifluoromethyl radical or a nitro group, and the other of X and Y stands for a fluorine, chlorine, bromine or iodine atom, a trifluoromethyl radical or a nitro group.

A suitable value for R is, for example, a methyl or ethyl radical.

A preferred compound of the present invention is 2-(m-trifluoromethyl-α-methoxycarbonylbenzylidene)-4-phenyl-3-hydroxy-5-oxo-2,5-dihydrofuran.

According to a further feature of the invention there is provided a process for the preparation of compounds of the formula I which comprises reacting a compound of the general formula:

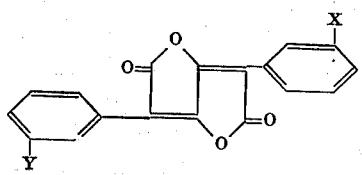

wherein X and Y have the meanings stated above, with an alkanol of the formula ROH wherein R has the meaning stated above.

The said reaction may optionally be carried out in the presence of an alkali metal hydroxide, for example sodium hydroxide or potassium hydroxide. In the case where an alkali metal hydroxide is present the reaction may be carried out at room temperature or at a moderately elevated temperature, for example at reflux temperature. In the case where an alkali metal hydroxide is absent the said reaction is preferably carried out at a moderately elevated temperature, for example at reflux temperature.

It is to be understood that the starting materials of formula II are obtainable by the adaptation of a general procedure described in the prior art.

According to a further feature of the invention there are provided pharmaceutical compositions comprising a dihydrofuran derivative of the general formula I, wherein R, X and Y have the meanings stated above, and a non-toxic pharmaceutically acceptable diluent or carrier.

The pharmaceutical compositions of the invention may, for example, be in the form of tablets, capsules, suppositories, non-sterile aqueous or non-aqueous solutions or suspensions, sterile injectable aqueous or non-aqueous solutions or suspensions, or creams, lotions or ointments, and they are obtainable by conventional procedures. Preferred compositions are dosage unit forms, for example tablets or capsules, which comprise 5 to 250 mg. of said dihydrofuran derivative of formula I. A dihydrofuran derivative of formula I may be administered to a human patient at a total daily dose of 50 to 1,000 mg. of the compound per 70 kg. bodyweight.

The pharmaceutical compositions of the invention may optionally contain, in addition to a dihydrofuran derivative of formula I wherein R, X and Y have the meanings stated above, at least one known agent having anti-inflammatory and/or analgesic activity, for example aspirin, paracetamol, codeine, chloroquine, phenylbutazone, oxyphenbutazone, indomethacin, mefenamic acid, flufenamic acid, ibufenac, or an anti-inflammatory steroid, for example prednisolone. Those compositions intended for oral administration may, in addition, optionally contain at least one anti-cholinergic agent, for example homatropine methyl bromide, and/or an antacid, for example aluminum hydroxide; and/or a uricosuric agent, for example probenecid. Those compositions designed for topical application may, in addition, optionally contain a vasodilating agent, for example tolazoline, or a vasoconstricting agent, for example adrenaline; a local anesthetic, for example amethocaine, or a counter-irritant, for example capsicum; and/or at least one agent chosen from the following classes: antibacterial agents, which include sulphonamides and antibiotics having antibacterial action, for example neomycin; antifungal agents, for example hydroxyquinoline; antihistaminic agents, for example promethazine; and rubefacient agents, for example methyl nicotinate.

The invention is illustrated but not limited by the following examples:

Example 1

3,6-Bis (m-chlorophenyl)-2,5-dioxo-2,5-dihydro-furo [3,2-b]-furan (13.75g.) was suspended in methanol (140ml.). To the stirred suspension was added 18N-sodium hydroxide solution (5 ml.). After 15 minutes at room temperature, the mixture was diluted with water (100 ml.) and acidified with 2N-hydrochloric acid to pH 1. the resulting precipitate was filtered off, washed with water and methanol, dried and crystallized from N-butanol, to give 2-(m-chloro-α-methoxycarbonylbenzylidene)-4-m-chlorophenyl-3-hydroxy-5-oxo-2,5-dihydrofuran, m.p. 178°–180° C.

The 2,6-bis (m-chlorophenyl)-2,5-dioxo-2,5-dihydrofuro-[3,2-b]furan used as starting material was prepared by the following method:

Sodium metal (7.4g.) was dissolved in dry ethanol (100 ml.). The solution was stirred and cooled to 20° C., and diethyl oxalate (23.1 g.) was added. The solution was stirred for 15 minutes, then cooled again to 20° C., and m-chlorobenzyl cyanide (50g.) was added. The mixture was heated and stirred at 60°–70 C. for 1 hour, and then allowed to cool to room temperature. It was diluted with water (30 ml.) and acidified to pH 5 with glacial acetic acid. More water (150 ml.) was added, and the precipitate was filtered off, washed with water and ethanol, and then dried and crystallized from dimethylformamide to give 3,4-dioxo-2,5-di-m-chlorophenyladiponitrile, m.p. 280°–281° C. (decomposition). This adiponitrile derivative (19.7g.) was stirred and refluxed for 20 minutes in a mixture of acetic acid (240 ml.), concentrated sulphuric acid (100 ml.) and water (147 ml.). The mixture was cooled to room temperature, the solid was filtered off, washed with acetic acid and water, and dried. This residue, which was a mixture of the required furo-furan and 2-(m-chloro-α-carboxy-benzylidene)-4-m-chlorophenyl-3-hydroxy-5-oxo-2,5-dihydrofuran, was stirred and refluxed in acetic anhydride (160 ml.) for 30 minutes. The mixture was cooled to room temperature, the solid was filtered off, washed with acetic acid and dried, giving 3,6-bis(m-chlorophenyl)-2,5-dioxo-2,5-dihydrofuro[3,2-b]furan, m.p. 279°–282° C.

Example 2

In a similar manner to that described in Example 1, and starting with the appropriately substituted benzyl cyanide, there were obtained:

2-(m-iodo-α-methoxycarbonylbenzylidene)-4-m-iodophenyl-3-hydroxy-5-oxo-2,5-dihydrofuran, m.p.218°–219° C. (crystallized from acetic acid); and 2-(m-trifluoromethyl-α-methoxycarbonylbenzylidene)-4-m-trifluoromethylphenyl-3-hydroxy-5-oxo-2,5-dihydrofuran, m.p. 147°–148° C. (crystallized from methanol).

Example 3

3-(m-Trifluoromethylphenyl)-6-phenyl-2,5-dioxo-2,5-dihydrofuro[3,2-b]furan (23.5g.) was dissolved in methanol (220 ml.) and 18N-sodium hydroxide (6ml.). After 30 minutes at room temperature the mixture was filtered, and the filtrate was diluted with water (220 ml.) and acidified to pH 1 with 11N-hydrochloric acid. The resulting precipitate was filtered off, washed successively with water and methanol, and dried. The solid (24g.) was dissolved in boiling methanol (7.5 l.), and upon cooling there was precipitated 2-($\alpha$-methoxycarbonyl-benzylidene)-4-m-trifluoromethylphenyl-3-hydroxy-5-oxo-2,5-dihydrofuran, m.p.234°–235° C. The filtrate was evaporated in vacuo to about 2 l. and the resulting precipitate was filtered off and crystallized twice from methyl acetate. There was thus obtained 2-(m-trifluoromethyl-$\alpha$-methoxycarbonylbenzylidene)-4-phenyl-3-hydroxy-5-oxo-2,5-dihydrofuran, m.p. 191°–192° C.

The starting material was prepared as follows:

A 50 percent w/w paste of sodium hydride in mineral oil (14.3g.) was stirred in sodium-dried ether (600 ml.) while absolute ethyl alcohol (13.7g.) was added over 1 hour. Diethyl oxalate (44.3g.) was added, followed after 15 minutes by m-trifluoromethylbenzyl cyanide (50g.). The mixture was stirred and refluxed for 24 hours, and then cooled and filtered. The solid residue was dissolved in water (1 l.), acidified to pH 2 with 11N-hydrochloric acid and extracted with ether (2 × 750 ml.). The ether extracts were dried ($Na_2SO_4$) and evaporated to dryness. The resulting white solid was crystallized from aqueous alcohol to give ethyl $\alpha$-cyano-$\alpha$-(m-trifluoromethylphenyl)pyruvate, m.p.119°–c° C.

A 50 percent w/w paste of sodium hydride in mineral oil (19g.) was stirred with dimethoxyethane (120 ml.) while benzyl cyanide (13.3g.) was added. After 15 minutes at room temperature the mixture was cooled to −10° C., and a solution of ethyl $\alpha$-cyano-$\alpha$-(m-trifluoromethylphenyl)pyruvate (32.5g.) in dimethoxy ethane (120 ml.) was added over 45 minutes while the temperature was maintained at −10° to −15° C. The mixture was stirred at −10° C. for a further 4 hours, and then for 3 days at 5° C. The mixture was diluted with water (850 ml.) and acidified to pH 4 with glacial acetic acid. The mixture was filtered and the solid residue was successively washed with water and ethanol, and then dried and crystallized from glacial acetic acid. There was thus obtained 1,4-dicyano-4-(m-trifluoromethylphenyl)-1-phenyl-2,3-dioxobutane, m.p.251°–253° C.

The above dicyano compound (30g.) was refluxed with a mixture of glacial acetic acid (360 ml.), concentrated sulphuric acid (150 ml.) and water (225 ml.) for 30 minutes. After cooling, the mixture was diluted with water (900 ml.) and the resulting mixture filtered. The solid residue was a mixture of 2-($\alpha$-carboxybenzylidene)-4-m-trifluoromethylphenyl-3-hydroxy-5-oxo-2,5-dihydrofuran and 2-(m-trifluoromethyl-$\alpha$-carboxybenzylidene)-4-phenyl-3-hydroxy-5-oxo-2,5-dihydrofuran. This mixture was washed with water, sucked dry on the filter paper, and then refluxed with acetic anhydride (120ml.) for 20 minutes. The mixture was then cooled and filtered. There was thus obtained 3-(m-trifluoromethylphenyl)-6-phenyl-2,5-dioxo-2,5-dihydro-furo[3,2-b]furan, m.p.166°–168° C.

Example 4

By a similar procedure to that described in Example 3, starting from m-chlorobenzyl cyanide there was obtained a mixture of 2-($\alpha$-methoxycarbonylbenzylidene)-4-m-chlorophenyl-3-hydroxy-5-oxo-2,5-dihydrofuran and 2-(m-chloro-$\alpha$-methoxycarbonylbenzylidene)-4-phenyl-3-hydroxy-5-oxo-2,5-dihydrofuran. This mixture (11.2g.) was extracted with boiling methanol (500 ml.). On cooling the extract and filtering the resulting mixture there was obtained 2-(m-chloro-$\alpha$-methoxycarbonylbenzylidene)-4-phenyl-3-hydroxy-5-oxo-2,5-dihydrofuran, m.p. 160°–163° C. The solid residue from the extraction was crystallized from glacial acetic acid and gave 2-($\alpha$-methoxycarbonylbenzylidene)-4-m-chlorophenyl-3-hydroxy-5-oxo-2,5-dihydrofuran, m.p.241°–242° C.

Example 5

The following are typical formulations to provide tablets according to standard pharmaceutical techniques.

| | | |
|---|---|---|
| (i) | 2-(m-Trifluoromethyl-$\alpha$-methoxycarbonyl-benzylidene)-4-phenyl-3-hydroxy-5-oxo-2,5-dihydrofuran | 200mg. |
| | 10% w/v aqueous gelatine solution | 9mg. |
| | Lactose | 400mg. |
| | Maize starch | 35mg. |
| | Magnesium stearate | 6mg. |
| (ii) | The above dihydrofuran derivative | 100mg. |
| | Lactose | 100mg. |
| | Maize starch | 25mg. |
| | Gelatine | 5mg. |
| | Stearic acid | 2.5mg. |
| (iii) | The above dihydrofuran derivative | 50mg. |
| | Lactose | 150mg. |
| | Maize starch | 25mg. |
| | Talc | 5mg. |

The dihydrofuran derivative was mixed with an inert diluent (lactose) and a binding agent (starch paste, gelatin solution, or acacia mucilage), and the mixture was granulated. A disintegrating agent (maize starch or alginic acid) was mixed with the granules, and a lubricating agent (magnesium stearate, stearic acid or talc) was then added. The mixture was compressed into tablets in known manner, and there were thus obtained tablets, containing, 50, 100 or 200 mg. of active ingredient, which were suitable for oral administration for therapeutic purposes.

What we claim is:

1. A dihydrofuran derivative of the general formula:

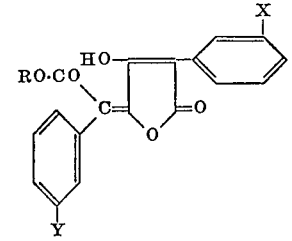

I wherein R stands for $C_{1-3}$ alkyl, and one of X and Y is a member selected from the group consisting of hydrogen, fluorine, chlorine, bromine, iodine, trifluoromethyl and nitro, and the other of X and Y is a member selected from the group consisting of fluorine, chlorine, bromine, iodine, trifluoromethyl and nitro.

2. A compound as claimed in claim 1 wherein R is a member selected from the group consisting of methyl and ethyl, and one of X and Y is a member selected from the group consisting of hydrogen, chlorine, iodine and trifluoromethyl, and the other of X and Y is a member selected from the group consisting of chlorine, iodine and trifluoromethyl.

3. A compound as claimed in claim 1 which is 2-(m-trifluoromethyl-$\alpha$-methoxycarbonylbenzylidene)-4-phenyl-3-hydroxy-5-oxo-2,5-dihydrofuran.

4. A process for the manufacture of a dihydrofuran derivative of the general formula:

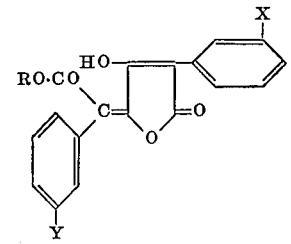

I wherein R stands for $C_{1-3}$ alkyl, and one of X and Y is a member selected from the group consisting of hydrogen, fluorine, chlorine, bromine, iodine, trifluoromethyl and nitro, and the other of X and Y is a member selected from the group consisting of fluorine, chlorine, bromine, iodine, trifluoromethyl and nitro, which comprises reacting a compound of the general formula:

II 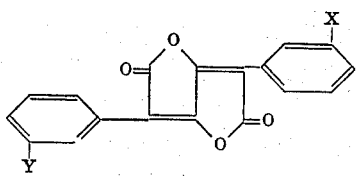
wherein X and Y have the meanings stated above, with an alkanol of the formula ROH, wherein R has the meaning stated above, and a member selected from the group consisting of sodium hydroxide and potassium hydroxide.
* * * * *